United States Patent [19]
Wilkinson

[11] Patent Number: 6,160,844
[45] Date of Patent: Dec. 12, 2000

[54] PROCESSING DIGITALLY ENCODED SIGNALS

[75] Inventor: James Hedley Wilkinson, Tadley, United Kingdom

[73] Assignees: Sony Corporation, Tokyo, Japan; Sony United Kingdom Limited, Weybridge, United Kingdom

[21] Appl. No.: 08/944,519

[22] Filed: Oct. 6, 1997

[30] Foreign Application Priority Data

Oct. 9, 1996 [GB] United Kingdom .................... 9621067
Jul. 28, 1997 [GB] United Kingdom .................... 9715917

[51] Int. Cl.$^7$ ....................................................... H04N 7/12
[52] U.S. Cl. .......................... 375/240; 382/232; 382/236; 375/240.01
[58] Field of Search ...................... 348/402, 405, 348/699–700, 426, 415; 386/52, 111

[56] References Cited

U.S. PATENT DOCUMENTS

| | | | |
|---|---|---|---|
| 5,191,436 | 3/1993 | Yonemitsu | 358/335 |
| 5,457,675 | 10/1995 | Suzuki et al. | 369/124 |
| 5,485,611 | 1/1996 | Astle | 395/600 |
| 5,577,191 | 11/1996 | Bonomi | 395/502 |
| 5,587,806 | 12/1996 | Yamada et al. | 386/68 |
| 5,617,142 | 4/1997 | Hamilton | 348/405 |
| 5,742,347 | 4/1998 | Kandlur et al. | 348/426 |
| 5,745,181 | 4/1998 | Wilkinson | 348/415 |
| 5,754,239 | 5/1998 | Wilkinson | 348/415 |

FOREIGN PATENT DOCUMENTS

| | | |
|---|---|---|
| 9 509 576 A2 | 10/1992 | European Pat. Off. . |
| 0 627 854 A2 | 12/1994 | European Pat. Off. . |
| 0 656 729 A2 | 6/1995 | European Pat. Off. . |
| 0 656 729 A2 | 7/1995 | European Pat. Off. ......... H04N 7/58 |

*Primary Examiner*—Andy Rao
*Assistant Examiner*—Shawn S. An
*Attorney, Agent, or Firm*—Frommer Lawrence & Haug, LLP.; William S. Frommer; Glenn F. Savit

[57] ABSTRACT

An MPEG2 encoded signal comprising intra-encoded pictures I and inter-encoded pictures B is decoded (70–74) to baseband and re-encoded (76) to I-pictures. The quantisation levels $Q_v$ and the motion vectors $M_v$ of the B pictures are retained unchanged and maintained in association with the corresponding pictures re-encoded as I-pictures. The I-pictures can be decoded to baseband, processed, and re-encoded as I-pictures without degradation. The I-pictures can then be re-encoded back to e.g. I, B pictures with minimal degradation. Alternatively, some of the I-pictures are decoded and converted to B pictures retaining unchanged the quantisation levels thereof.

30 Claims, 7 Drawing Sheets

BLOCK LAYER
(PRIOR ART)

MICRO BLOCK LAYER
(PRIOR ART)

SLICE LAYER
(PRIOR ART)

PICTURE LAYER
(PRIOR ART)

GOP LAYER
(PRIOR ART)

SEQUENCE LAYER
(PRIOR ART)

PROCESSING DIGITALLY ENCODED SIGNALS

BACKGROUND OF THE INVENTION

1. Field of the Invention

The present invention relates to the processing of digitally encoded signals. An illustrative application of the invention is to signals encoded according to MPEG 2.

2. Description of the Prior Art

MPEG 2 is well known and is defined in ISO/IEC13818-2. MPEG 2 encoding is reviewed in for example the booklets "MPEG—Digital Television For All" by NTL published by Swift Television Publications, England ISBN 187256707X and "Video Compression Technology" by Sony Broadcast and Professional Europe, Jays Close, Viables, Basingstoke, Hampshire, RG22 4SB, United Kingdom.

Reference will now be made by way of background, to FIGS. 1 to 3 of the accompanying drawings. FIG. 1 illustrates the hierarchy of layers of an MPEG2 encoded signal. FIG. 2 is a simplified block schematic diagram of an MPEG 2 encoder and FIG. 3 shows simplified diagrams of groups of pictures (GOP) which may be produced by the encoder.

The following explanation is not intended to provide a detailed description of MPEG 2. It is intended to give the background to the present invention.

Hierarchy of Layers

Referring to FIG. 1, MPEG2 encodes video signals and organises the encoded signals in a hierarchy of layers. For simplicity of explanation only luminance (Y) of complete frames, is discussed in the following.

An analogue frame F is sampled and digitised, and divided into 8×8 blocks B of pixels (x) (FIG. 1A).

For luminance, groups of 4 blocks, which are subject to processing discussed hereinbelow, are grouped into macroblocks M (FIG. 1B).

(Additional blocks are added for chrominance).

Contiguous macroblocks M are organised into slices S (FIG. 1C). As shown each slice has a length corresponding to one picture width (frame width). However a slice may have any length providing a slice comprises contiguous macroblocks from only one picture (frame).

A picture P (frame) is made up of one or more slices S (FIG. 1D).

Pictures P are grouped together to form a Group of Pictures (GOP) (FIG. 1E). A GOP may be "open" or "closed" as discussed hereinbelow with reference to FIG. 3A and B.

A sequence is made up of one or more GOPs (FIG. 1F).

Coding

Referring to FIG. 2, there is shown a simplified block diagram of an MPEG encoder.

It is assumed that the signal at the input to block 1 of FIG. 1 is a sampled and digitised video signal the frames of which have been re-ordered in manner conventional in MPEG by a frame reorderer (not shown) so that each picture within a GOP is compressed after these pictures on which it depends.

Temporal redundancy 1 is removed from the digital signal by producing signals representing the motion compensated differences between frames. In practice the difference is between a frame and a prediction from one or more other frames (normally a maximum of 2). The differences are ultimately referenced to a frame called an I-frame (intra-frame) in which the coding information is preserved within the frame. Two types of difference frame are produced called P-frames and B-frames, which are termed inter-encoded frames.

P-frames are frames predicted from a single preceding reference frame which may be a previous I-frame or a previous P-frame. A P-frame may be separated from its reference frame by one or more intervening frames.

B-frames are frames are bi-directionally interpolated from the nearest preceding I or P-frame and the nearest succeeding I or P-frame. The number of B-frames between I and/or P-frames is selectable.

A GOP must include at least one I-frame. It may additionally include one or more B and/or P frames.

The frames are subjected to reduction of spatial redundancy by means of a Discrete Cosine Transformation (DCT) 2. I-frames or intra-encoded frames are subjected to DCT without being subjected to temporal redundancy reduction.

DCT is carried out on the blocks by matrix multiplication of the pixel values by a set of coefficients which form the Discrete Cosine Transform. The DCT produces a two-dimensional 8×8 array of spatial frequency coefficients for each 8×8 input block.

Macroblocks are used in motion compensation. Motion vectors are derived in a motion vector estimator 7 to indicate where a macroblock in a current frame is positioned in respect of the prediction frames. The motion vectors are associated with P and B-frames. They allow data reduction additional to that achieved by temporal 1 and spatial 2 redundancy reduction by reducing prediction errors advised by movement of picture objects over the prediction period.

The DCT array of spatial frequency coefficients is subject to quantisation 3, by a two dimensional quantisation weighting matrix, which weights the quantisation of the DCT coefficients typically in accordance with the properties of the human visual system. Most of the information of an image is in low spatial frequencies. Low spatial frequencies are quantised with a high level of accuracy. The eye is less sensitive to noise in high spatial frequencies and so such frequencies are more coarsely quantised, further reducing the amount of data.

The amount of data varies with the content of the image. It is desirable to produce a constant bit rate. For that purpose the quantisation is controlled by a quantiser scale value Qv which is varied to maintain a constant bit rate. As shown in FIG. 2 this may be done by varying Qv to keep the occupancy of a buffer 4 constant.

The quantised data is then subject to entropy encoding 5, 6 which comprises for example run-length coding 5 and Huffmann coding 6. Run-length codes reduce the data by indicating the number of zeroes in a run of zeroes instead of transmitting all the zeroes as separate codes.

Thus a data stream (00000003) decimal would be run-length encoded as a code pair (7, 3) decimal.

The code pairs are encoded in Huffmann coding by assigning to each pair a code indicative of the probability of the occurrence of the pair.

Through careful adjustment of quantiser scale value, Qv, the output of the buffer 4 is a bitstream of substantially constant bit rate. The bit stream represents at least I-frames usually together with P and/or B-frames.

Syntax

The bitstream includes data called the MPEG syntax, which is defined in ISO/IEC13818-2 indicating how the data in the bitstream is organised, and the manner in which it is encoded to facilitate decoding of the bitstream.

Referring to FIG. 1, syntax data; includes, inter alia, the following:-

SM is associated with the macroblocks;

SS is associated with the slices;

SP is associated with the frames or pictures;

SG is associated with the GOPs; and

SH is associated with the sequence.

The syntax SM of the macroblocks includes, inter alia,
1. data defining the motion vector values and
2. the quantiser scale code The syntax data SP of a frame includes inter alia,
1. data indicating type of frame i.e. I, P or B;
2. data indicating for B and P frames the reference frame from which it is derived and
3. data relating to concealment vectors.

The syntax data SG of a GOP includes, inter alia:
1. data indicating whether the GOP is open or close.

The syntax data of a sequence SH includes, inter alia:
1. the picture size in horizontal and vertical pixels; and
2. video buffer verifier size.

It is desirable to reduce as much as possible the amount of data representing a video signal consistent with reliable decoder operation and (maintenance of) a desired picture quality.

I-frames require more data than P-frames and P-frames require more data than B-frames. Thus it is desirable to maximise the use of B and P-frames.

Signal Processing

In studio and post-production processing of video signals, the signals are edited in a variety of ways. The simplest edit is cutting. Other editing processes include cutting and insertion of new sequences, and cross-fading between different sequences.

Editing needs to be accurate to the nearest frame or in some circumstances the nearest field. As observed in NTL's booklet "editing could only take place at frames which contain the complete information, I-frames". However, frames are arranged in GOPs, where the GOP length is greater than 1, and hence the content of one frame is dependant on that of another resulting in problems even if an edit takes place at I-frames.

Referring to signal A in FIG. 3, a GOP may be closed, meaning that all the information needed to decode the GOP is contained in the GOP and hence referenced to only one I frame. FIG. 3 signal A shows a sequence of 2 arbitrary GOPs, GOP1 and GOP2 comprising I, B and P-frames. All the B and P-frames are ultimately referenced to the initial I-frame 21. The last B-frame 22 is referenced to the preceding P-frame 23 and the last P-frame 24 of the GOP and thus can be decoded within the GOP.

An open GOP requires data from an adjacent GOP for decoding. Signal B in FIG. 3 shows an arbitrary open GOP from which it is apparent that e.g. the last, B-frame 31 of the first GOP GOP1 requires data from the initial I-frame 32 of GOP2. If an edit took place at the boundary between GOP1 and GOP2 of the closed GOPs of signal A of FIG. 3 no problem occurs. Each GOP is still decodable. However if an edit took place between I-frame 32 and B-frame 31, of the signal B the B-frame 31 could no longer be accurately decoded because it is separated from one I32 of its two reference frames. A prior proposal for dealing with this is to simply redesignate the B-frame as a P-frame with a loss of accuracy in subsequent decoding. In the example of signal B of FIG. 3 an edit at the boundary between the two open GOPs would prevent accurate decoding of the GOPs because they are interdependent.

It has been previously proposed for editing therefore that the MPEG 2 encoded bitstream is decoded at least to the digital baseband (i.e. the original unencoded digital signal), then edited and then re-encoded back to MPEG 2.

However, the re-encoding process involves a further loss of information. Whilst the temporal redundancy reduction and DCT operations are loss-less when sufficient accuracy is maintained, quantisation introduces quantisation errors which vary with the quantisation scaling control Qv involving some loss of data.

Studio and post-production processing can involve several stages of processing and each may involve decoding, editing and re-encoding. The losses inherent in the encoding operation accumulate and degrade the quality of the image represented by the bitstream.

SUMMARY OF THE INVENTION

In accordance with one aspect of the present invention, there is provided a method of processing digitally encoded signals comprising intra-encoded pictures and inter-encoded pictures, the inter-encoded pictures having associated therewith respective quantisation levels the method comprising converting the inter-encoded pictures to intra-encoded pictures retaining the respective quantisation levels of the pictures unchanged.

In a preferred embodiment the inter-encoded pictures have associated therewith motion vectors and the motion vectors are also retained unchanged in association with the respective converted pictures.

In accordance with another aspect of the present invention, there is provided apparatus for processing digitally encoded signals comprising intra-encoded pictures and inter-encoded pictures, the inter-encoded pictures having associated therewith respective quantisation levels the apparatus comprising means arranged to convert the inter-encoded pictures to intra-encoded pictures retaining unchanged the respective quantisation levels of the pictures. In a preferred embodiment the inter-encoded pictures have associated therewith motion vectors and the motion vectors are also retained unchanged in association with the respective converted pictures.

"Pictures" means fields or frames. Reference is made hereinafter to frames for convenience.

Preferably the signals are encoded according to MPEG 2, the intra-encoded frames being MPEG 2 I-frames and the inter-encoded frames being MPEG 2 P and/or B-frames. The following description refers to MPEG 2 encoded signals for convenience.

It has been found from multi-generation tests that I-frames exhibit negligible re-construction errors when repeatedly decoded to baseband and re-encoded as I-frames provided the coding is accurately implemented and the quantisation level is identical at each stage of multi-generation.

Thus by converting an encoded digital signal having intra-encoded and inter-encoded frames to all intra-encoded frames, the resultant I-frames can be repeatedly decoded to baseband, processed and re-encoded as I-frames with negligible further degradation.

Once the I-frames, which were P or B-frames originally, have been processed, they may be re-encoded back to their original encoded form as P or B-frames.

To reduce losses involved in the quantisation process, the original quantisation levels Qv represented in the MPEG syntax for original I, P and/or B-frames is maintained in association with the frames.

Furthermore, the motion vectors, represented in the MPEG syntax associated with the original B-frames, are preferably also retained in association with the corresponding I-frames. This reduces errors which would otherwise be incurred in recalculating the motion vectors when re-encoding the I-frames back to B or P frames.

The MPEG 2 syntax allows motion vectors to be carried in an I-frame as 'concealment vectors'.

The conversion to all I-frames allows full frame accurate editing.

A further development of the said aspects of the present invention concerns the problem of further reducing the bandwidth or data rate of a digital encoded, and compressed, signal. The further reduction may be to allow the data rate of the signal to match that of a transmission channel or to reduce the data to be stored in a signal storage device.

According to the further development, there is provided a method of processing digital encoded signals in which a first digitally encoded signal has at least intra-encoded pictures each having quantisation levels, at least some of the intra-encoded pictures of the first signal are converted to inter-encoded pictures, the quantisation levels thereof being retained unchanged, to produce a second digitally encoded signal and the said inter-encoded pictures of the second signal are re-converted to intra-encoded signals retaining unchanged the quantisation levels thereof, to produce a third signal.

According to the further development, there is also provided apparatus for processing digital encoded signals apparatus for processing digitally encoded signals, comprising means, having an input for receiving a first digitally encoded signal including at least intra-encoded pictures, for converting at least some of the intra-encoded pictures to inter-encoded pictures retaining unchanged the quantisation levels thereof to produce a second digitally encoded signal, and means for reconverting the said inter-encoded pictures of the second signal to intra-encoded pictures retaining unchanged the quantisation levels thereof to produce a third signal.

In the further development, the first signal may include intra- and inter-encoded pictures and at least some of the intra-encoded pictures are converted to further inter-encoded pictures, retaining unchanged the quantisation levels, in the second signal. The further inter-encoded pictures are re-converted to intra-encoded pictures in the third signal with unchanged quantisation level. The inter-encoded pictures may be P and/or B pictures.

In a preferred embodiment of the further development the first digitally encoded signal has a GOP of 1 frame:-I. To reduce the data rate of such a signal the GOP is increased in length, to 2 or more. The first frame of each GOP is retained as I, but other I frames in the larger GOP are converted to inter-encoded frames, i.e. to P and/or B frames. The resulting second signal of reduced data rate may be transmitted in the narrower bandwidth channel and/or stored store. This allows the capacity of the store to be reduced or allows more information to be stored. After transmission and/or read-out it is re-converted to its original form as the said third signal having a GOP of 1 frame.

In accordance with the present invention, the quantisation levels of the original frames are maintained unchanged throughout the conversion from first to second to third signal.

Thus intra-encoded frames are converted to inter-encoded frames with unchanged quantisation level and then converted back to intra-encoded frames with unchanged quantisation level. Degradation of image quality is minimised.

It is preferable that the second signal has a bandwidth or data rate which matches that of the transmission channel and/or store to which it is applied. Therefore, the second signal, as initially converted, may have a bandwidth or data rate less than that of the channel and/or capacity of the store and justification bits are added to it to produce the second signal which matches the bandwidth.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 4A:
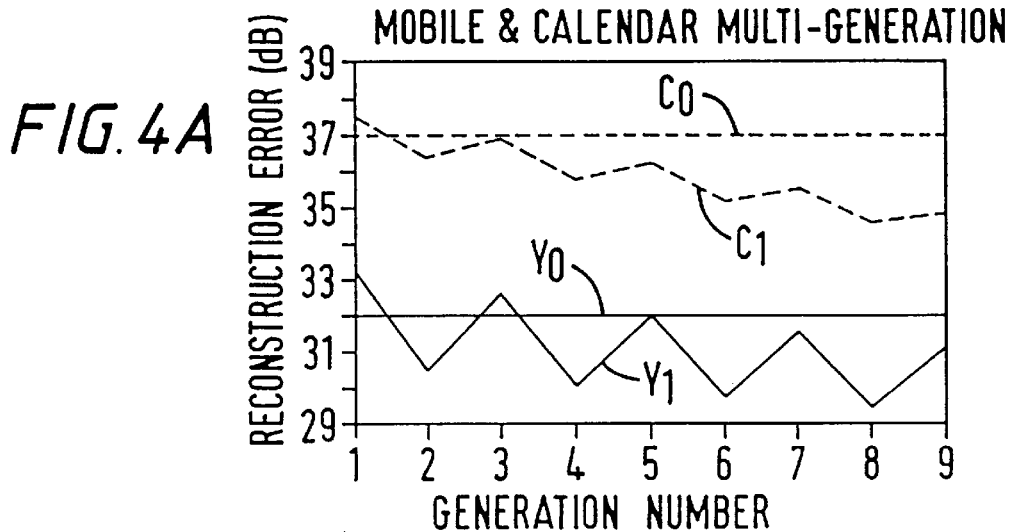
FIGS. 4A to C are graphs showing the relationship between reconstruction errors and generation number for I and B-frames subject to plural decoding and recoding, for various image sequences.
Figure 4B:
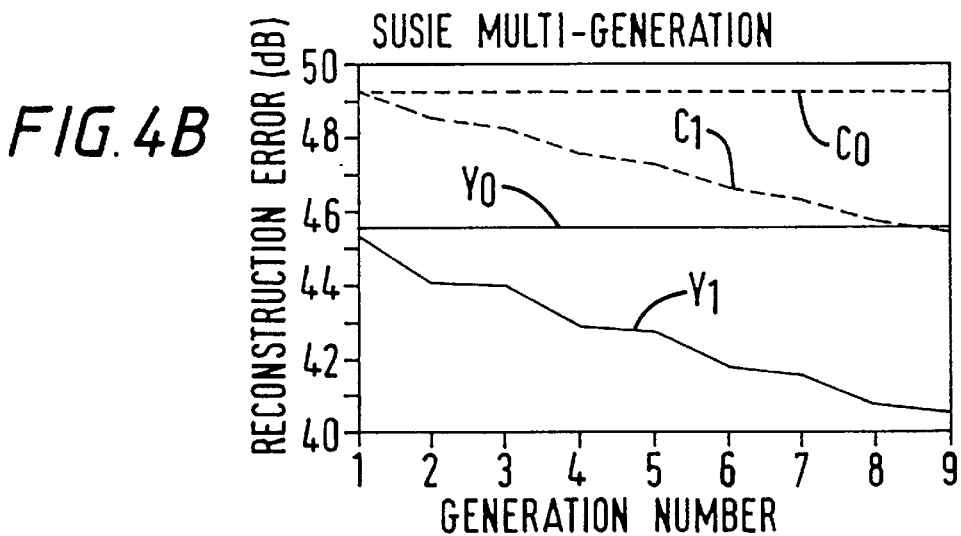
Figure 4C:
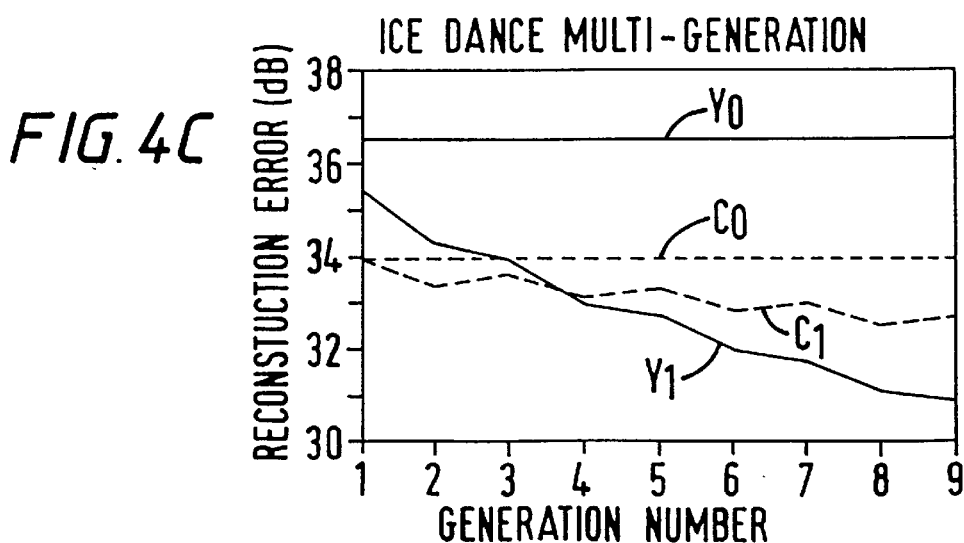

The present invention is based on multi-generation tests in which I-Frames were repeatedly decoded to baseband and re-encoded back to I-frames, and B-frames were repeatedly decoded to baseband and re-encoded as I and then back to baseband and then back to B-frames. The tests were performed on signals representing various image sequences and FIGS. 4A to C show the results for three standard test images well known in the art using linear quantisation. Each generation of B-frames used the same motion vectors. For FIG. 4A the image sequence used was "Mobile and Calendar" which is known to be a "difficult" sequence to encode with a slow pan of highly detailed wallpaper and a calender. The picture contains high levels of luminance and chrominance, with a low level of noise.

For FIG. 4B the image sequence used was "Susie"; a head shot with still background. There is head and hair motion.

For FIG. 4C the image sequence used was "Ice Dance" involving skaters performing in a shopping arcade. The sequence is a 7th generation of an MPEG 2 I-B GOP-2 encoded signal and has compression artifacts in the form of noise and picture distortions. In FIGS. 4A to 4C Yo and Co represent reconstructions errors of luminance (Yo) and chrominance (Co) of I-frames. $Y_1$ and $C_1$ represent reconstruction errors of B-frames alternately coded as I and B frames at each generation.

All the results show that I-frames have negligible reconstruction errors over multiple generations.

The FIGS. 4A and B show that the B-frames, have an increased reconstruction error at generation 2 compared to generation 1 but a reduced reconstruction error at generation 3 compared to generation 2 and continues with a zig-zag sequence with an accompanying trend to increasing reconstruction error.

In FIG. 4A, the B-frame shows small trend to increasing error. The trend is greater in FIG. 4B.

In FIG. 4C, derived from a noisy sequence, the trend to increasing reconstruction error is steep.

The results for frames (Yo, Co) which are always coded as I show negligible loss over the nine generations of the test. The results for frames ($Y_1$, $C_1$) which are coded alternately between B and I show an interesting result whereby the loss after the first generation (B) is made worse by varying degrees after the second generation (I), but then improves after the third generation and continues with a zig-zag sequence sometimes with an accompanying overall downward trend. The extra loss after the second generation might be expected since the result is a cascade of quantising two essentially different signals (an I-frame and a B-frame). However, the recovery after the third and successive odd numbered generation was not expected. A postulation for this observation is now suggested with the aid of FIG. 5.

Figure 5:
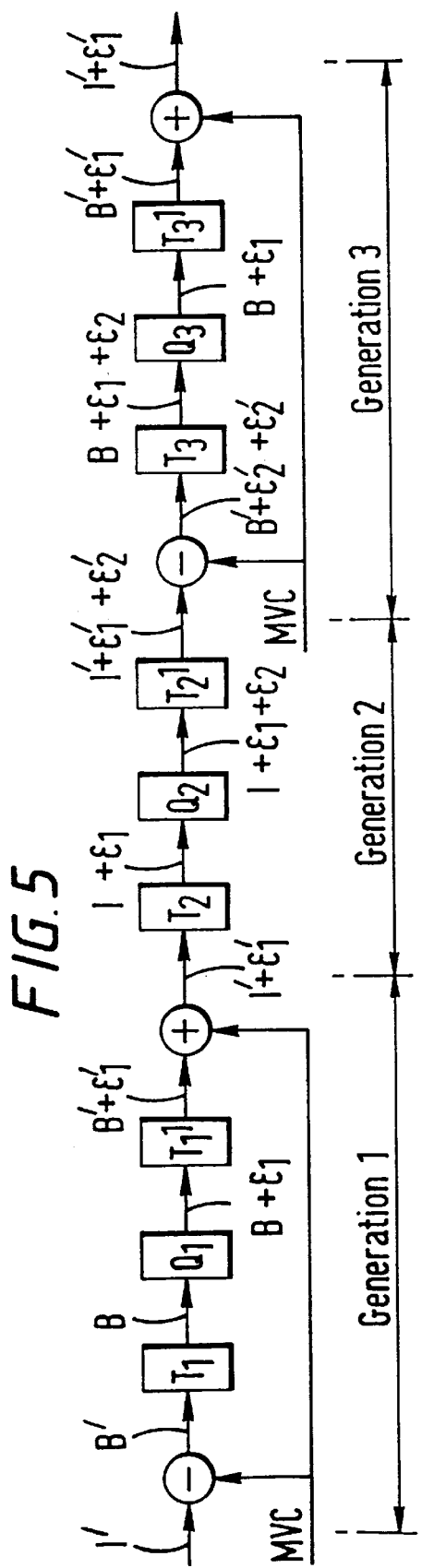
FIG. 5 is a diagram useful in explaining the results of FIGS. 4A–C.

In FIG. 5, I and B and $\epsilon$ without apostrophes represent transformed frames. I' and B' and $\epsilon'$ represent baseband frames. At the first stage (Generation 1) of coding, each pixel of a B-frame is subjected to a quantisation process Q1 which introduces a quantisation error of up to $\pm\epsilon/2$ and shown in the figure as $\epsilon_1$ and $\epsilon_2$ for the first two generations. Provided the motion prediction values are consistent between generations and the DCT ($T_1$) and IDCT ($T_1^{-1}$) are sufficiently accurate to ensure near perfect reconstruction, then the errors input into the second generation quantiser are the same as those created in the first generation ($\epsilon_1$). The second quantiser Q2 creates a new set of errors ($\epsilon_2$) since the signal input is essentially very different being the transformed components of an I rather than a B-frame. The output of the quantiser Q2 of generation 2 is shown as the transformed source added to the separate error components $\epsilon_1$ and $\epsilon_2$. The reason for keeping the errors as separate components becomes apparent at the third generation. At the third generation, the motion vector prediction signal is almost identical to that in the first generation because the surrounding I-frames have almost no generation loss and the motion vector information is carried directly from the first to the third generation. Therefore, given sufficient accuracy in the transforms and motion vector compensation process, the input to the third generation quantiser Q3 will be the transformed frame of the first generation together with the added errors created by the first and second generations. Now the component (B+$\epsilon_1$) is a rounded number which needs at least $\pm\epsilon/2$ additional signal to force a change of state in the quantiser output. Since the quantiser level is kept constant over the generations, then the errors created by the third generation quantiser cannot cause the component (B+$\epsilon_1$) to change and the error component $\epsilon_2$ is cancelled. The output of the third generation is then the same as that at the first generation. This effect is more pronounced in certain picture types and in non-linear quantisation rather than linear. The process seems to be better preserved with non-linear quantisation because the error magnitude is increased for low level signals thereby reducing the chance of third generation quantiser errors causing the rounding threshold to be breached. The process is sensitive to minor errors created in the I-frames used to create the motion compensated prediction value.

Figure 6:
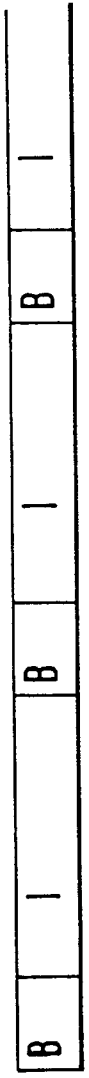
FIG. 6 illustrates an illustrative MPEG 2 encoded signal.

Referring to FIG. 6, there is shown an MPEG 2 encoded signal formatted for use by a DVTR according to a proposal by Sony and known as "Betacam SX". The Betacam SX signal has a GOP of 2 frames, every GOP comprising an I-frame and a B-frame.

Figure 7:
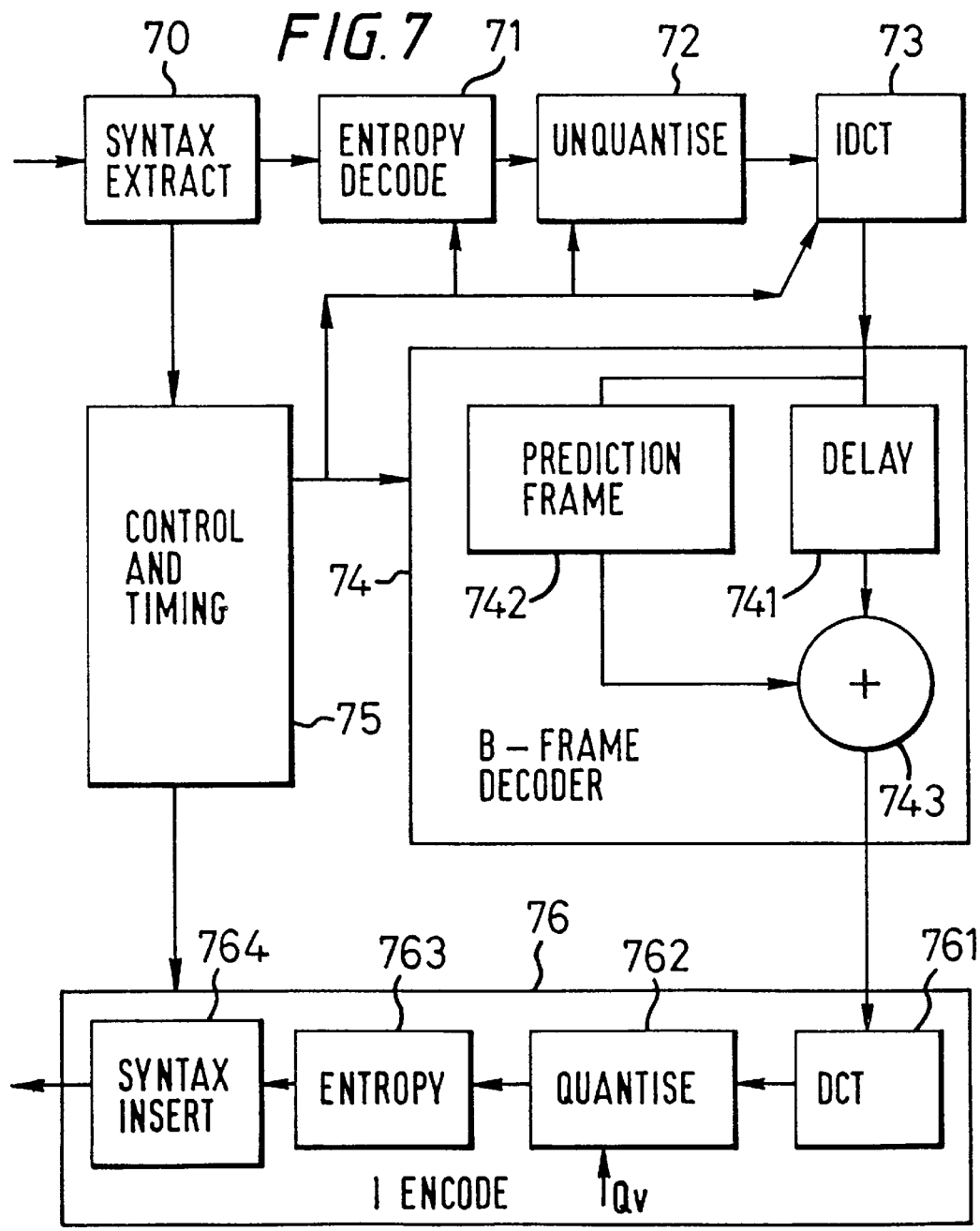
FIG. 7 is a block schematic diagram of a signal processor in accordance with the invention.

Referring to FIG. 7 there is shown a codec in which the SX signal is applied to a syntax detector 70 which extracts from the digital bitstream data relating to motion vector values MV, quantisation scale Qv, and frame type identification I, B, P.

Such a detector is within the knowledge of those skilled in the art. The syntax is applied to a control and timing circuit 75 which controls the quantisation of the codec.

The SX signal is entropy decoded in an entropy decoder 71 and supplied to an "unquantiser" 72 which is also supplied, for each frame, with the quantisation level Qv for that frame.

The unquantised signal is then subjected to an Inverse Discrete Cosine Transform in IDCT 73 and fed to a B-frame decoder 74.

The B-frame decoder 74 receives from the control circuit 75 the frame identification signal and the motion vectors MV appropriate to the frame being decoded.

I-frames are output via a delay line 741 having a delay corresponding to one I frame and one B frame as outputted by the IDCT 73. The I frames are unchanged because they are already fully decoded. I-frames are stored in stores in a predicted frame generator 742 as known in the art. The I frames and motion vectors are used to regenerate a prediction of the B frame between them. The prediction frame is then added to the B frame in adder 743 to decode the B frame.

The output of the adder 743 is a decoded baseband digital bitstream representing frames of video information. The frames are in their correct sequential order at the output of the B frame decoder any necessary reordering having taken place in the B-frame decoder.

The baseband bitstream is then encoded to I-frames in an MPEG encoder 76 which may be as shown in e.g. FIG. 1. Alternatively the encoder 76 may comprise a DCT coder 761, a quantiser 762 and an entropy encoder 763 as shown in FIG. 7, temporal redundancy reduction being unnecessary for I-frames. The encoding is controlled so that all the frames are encoded as I-frames. The quantisation of each I-frame is controlled by circuit 75 so it has the same quantisation levels as its corresponding original frame and has the same motion vector as its corresponding original frame. The control circuit 75 controls the encoder 76 and the syntax inserter 764 thereof so that: the original quantisation level Qv each frame is maintained; and motion vectors of I frames derived from B frames are associated with the I frames as concealment vectors.

It will be noted that frames which were originally I-frames are decoded to baseband and re-encoded as I-frames. Whilst that is unnecessary in theory, as discussed above it has been found that I-frames may be decoded to baseband and re-encoded many times with negligible loss provided the original picture content of the I frame remains unchanged. Also, the bitstream can be passed through the decoder/encoder of FIG. 7 without the need to separate I and B-frames, the B-frames anyway requiring the I-frames for decoding. Thus decoding I-frames to baseband and re-encoding them as I-frames is a convenient and virtually loss-less process, including no extra processing where B-frames also need decoding.

Figure 8:
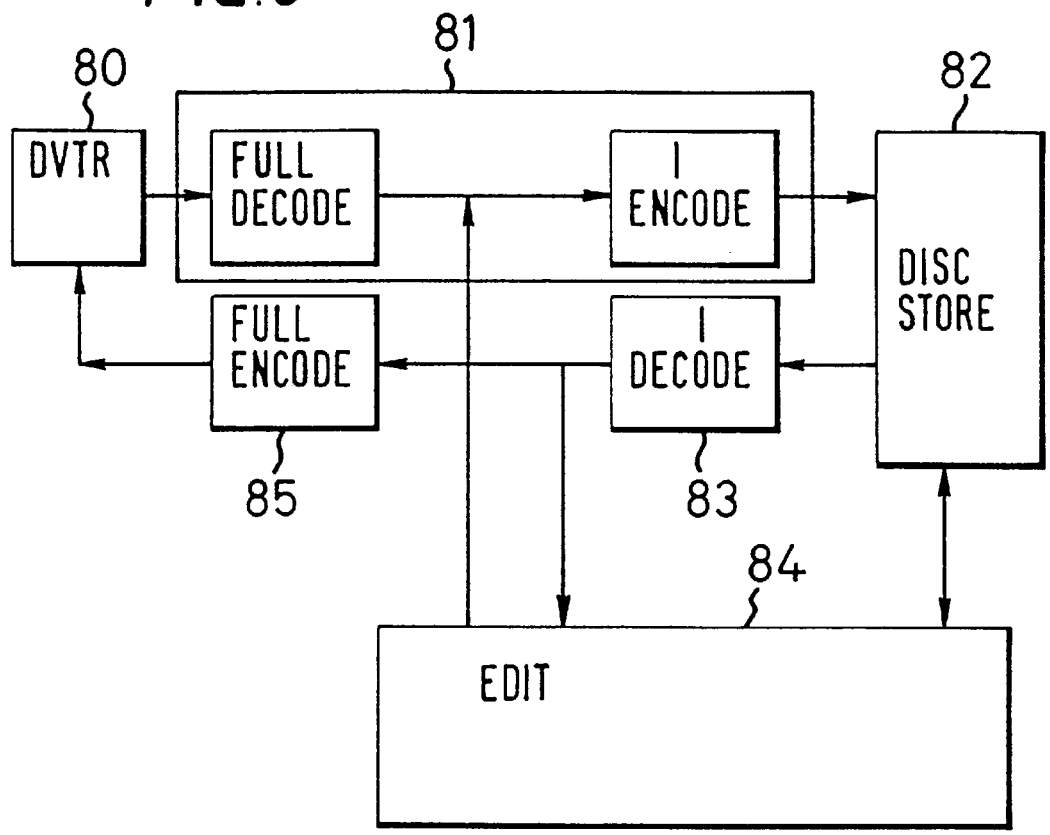
FIG. 8 is a block schematic diagram of an editing system incorporating the signal processor of FIG. 7.

Referring to FIG. 8, there is shown an illustrative editing system incorporating the present invention.

A signal source of MPEG 2 encoded signal consisting of I and B-frames, in this example is a digital video tape recorder (DVTR) 80, e.g. a Betacam SX recorder. The DVTR 80 records digital signals on formatted tape having a fixed format. Such a formatted medium is suitable for SX encoded signals where the maximum bit rate for the I- and B-frames is known and is constant. The I/B output of the DVTR is fully decoded and I-encoded 76 in a codec 81 which is as shown in FIG. 7 for example.

The I-encoded output of the codec 81 is recorded in a disc store 82 having a flexible format, such as a magnetic disc (often called a hard disc).

A flexible format is required because the frames originally encoded as B with a set quantisation level when re-encoded as I at the same quantisation level will have a variable data content dependent on the image they represent.

Editing takes place at baseband. For that purpose, an I decoder 83 is provided to decode the I-frames stored on the disc to baseband. An editor 84 as known in the art controls the disc store 82 and reads from it the video sequences to be edited. Once edited, the baseband video sequences are recorded as I-frames using the I-encoder 76 and stored back on the disc. This can be done because as discussed above decoding and recoding I frames is a virtually loss-less process for simple edits.

Edited I-frame sequences may be stored on the DVTR 80 in their original I/B form. For that purpose the I-frames sequences are read from the disc, decoded to baseband in I decoder 83 and re-encoded as I/B-frames in a encoder 85.

The above description assumes that the editing involves only cuts, and/or sequence insertions, which after editing alter the sequences but do not alter the content of individual frames.

Figure 9:
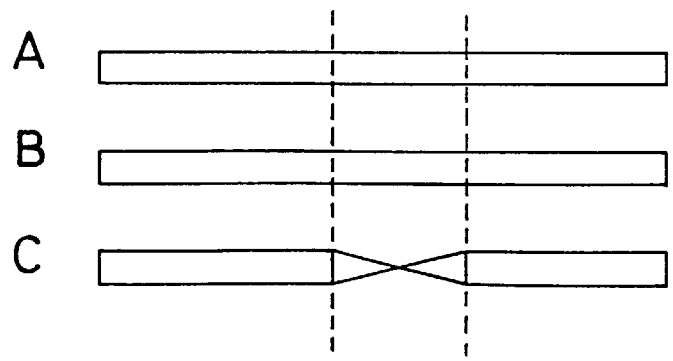
FIG. 9 illustrates an editing process.

FIG. 9 illustrates a cross-fade, in which a portion of a signal A forms the first portion of an edited signal C, a portion of a signal B forms a third portion of the edited signal C, but the second portion of signal C intermediate the first and third portions is a cross-fade, i.e. a mixture of portions of signals A and B. The cross-fade portion is effectively a new signal, the contents of individual frames being different from the corresponding frames of both the A and B signals from which they are derived. The result of the mix is stored as a new sequence of I frames on the hard disc 82 and recorded in a new SX bitstream when recorded on tape.

Whilst an illustrative embodiment of the invention has been described with reference to a GOP of 2 frames consisting of an I-frame and a B-frame, the invention may be applied to GOPs of greater length comprising I and P frames or I, B and P-frames.

Figure 10:
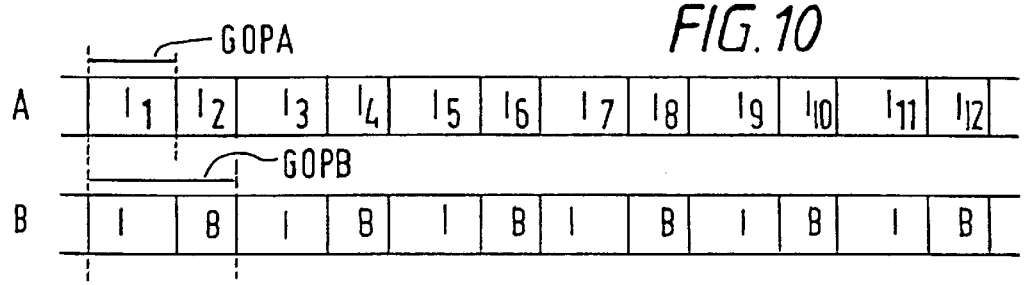
FIG. 10 is a schematic diagram of an intra encoded signal A and of an encoded signal B having a GOP of 2.
Figure 11:
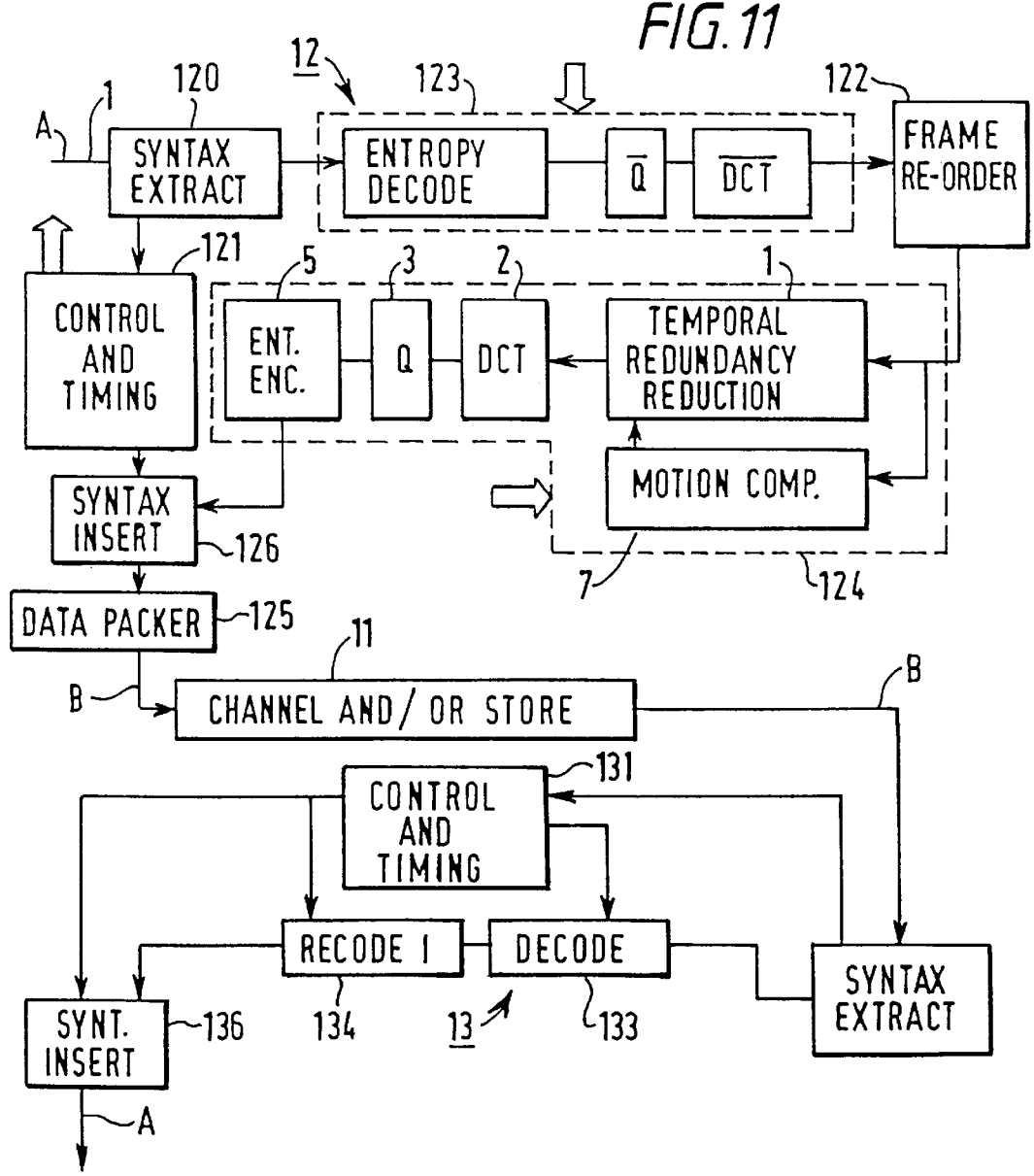
FIG. 11 is a schematic block diagram of a signal processing system according to the invention.

A further application of the invention is illustrated in FIGS. 10 and 11.

Referring to FIG. 10, there is shown by way of example a first, signal A which is an MPEG-2 Intra-frame encoded signal having a GOP length of 1, consisting of I-frames. The signal A of FIG. 10 has a particular, first, bandwidth or data rate.

Referring to FIG. 11, it is desired to transmit the signal in a channel 11 having a second bandwidth or data rate less than that of the Intra encoded signal. Alternatively, it is desired to store the intra frame coded signal in a storage device 11. By reducing the data to be stored, either a store of reduced capacity can be used or effectively more signal information can be stored.

In accordance with an embodiment of the invention the bandwidth or data rate of the first signal A is reduced by increasing the GOP length e.g. from 1 to 2 by converting alternate I-frames, to e.g. B-frames, as shown by the second signal B in FIG. 10, whilst retaining unchanged the quantisation levels of the original frames.

It will be appreciated that at least some of the converted I-frames of the first signal could be converted to P-frames in the second signal B if desired retaining the quantisation levels unchanged. Also the GOP length of the second signal may be increased to any length equal to or greater than 2.

Thus as shown in FIG. 10, the I frame $I_2$ is converted in the second signal B to a B frame with the quantisation levels of the B frame equal to the corresponding quantisation levels of frame $I_2$.

The second signal B of FIG. 10 is transmitted and/or stored in channel 11, and then reconverted back to its original form A as shown in FIG. 10 again retaining unchanged the quantisation levels. As discussed hereinbefore, this minimises degradation of image quality.

Referring to FIG. 11, there is shown apparatus in accordance with this embodiment of the invention.

The first signal A of FIG. 10 is applied to a signal decoder and re-encoder 12 which converts the first A signal to the second signal B. The second signal B is applied to the transmission channel and/or store 11. The second signal from the channel/store 11 is applied to a decoder/re-encoder 13 which converts it back to its original form as the first signal A.

Figure 1A:
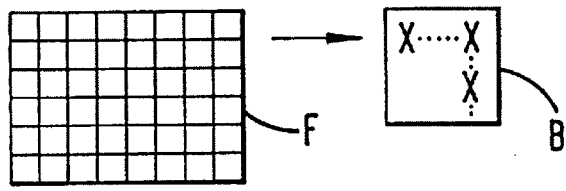
FIGS. 1 to 3 described hereinbefore show background to the present invention.
Figure 1B:
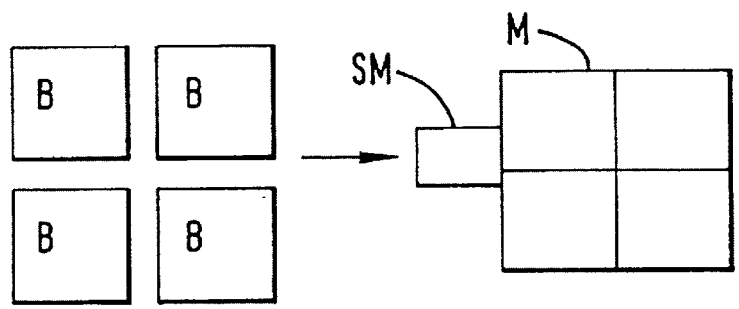
Figure 1C:
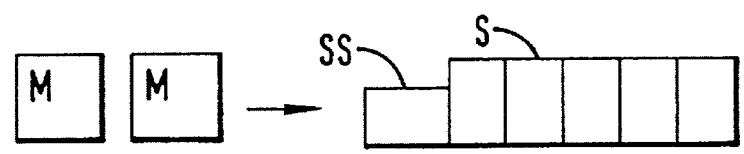
Figure 1D:
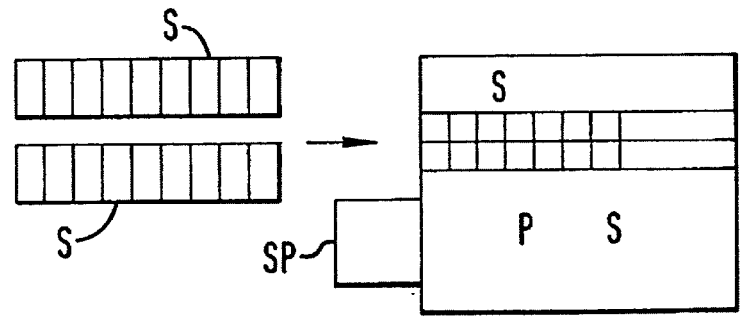
Figure 1E:
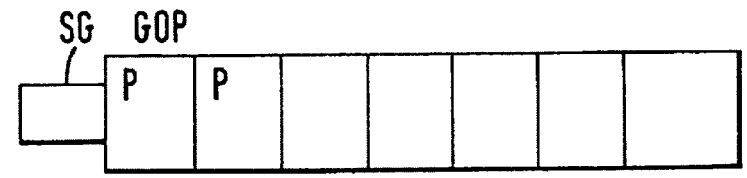
Figure 1F:
Figure 2:
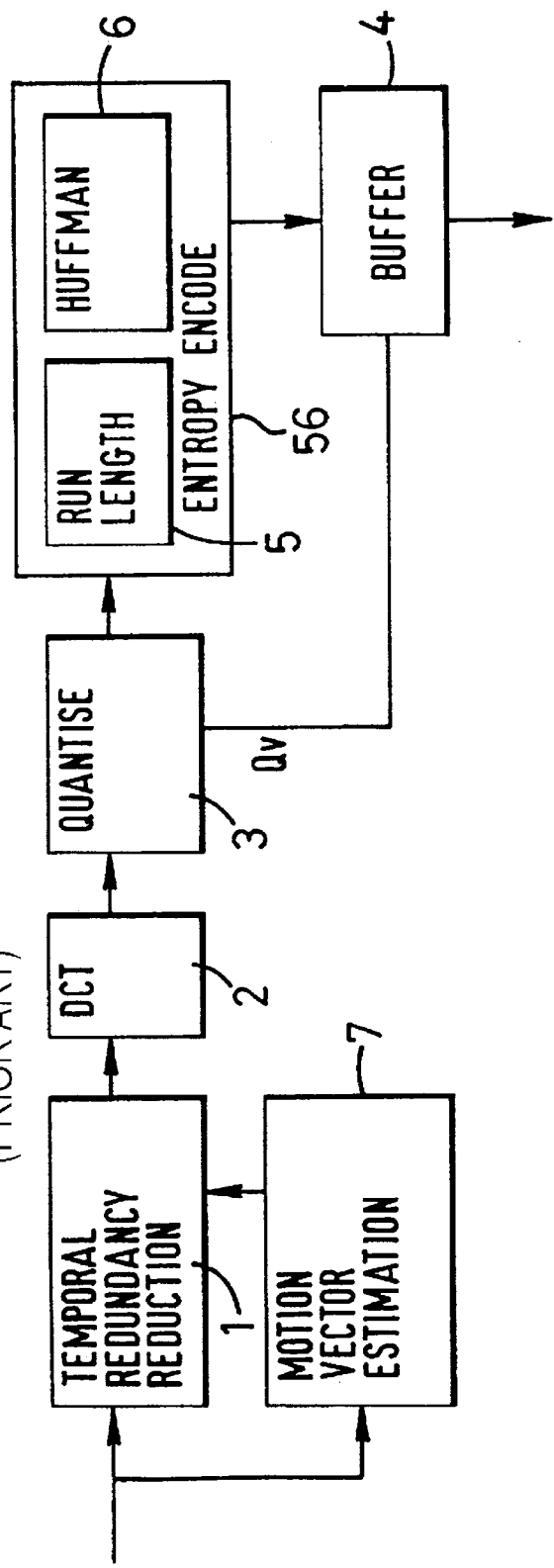
Figure 3:
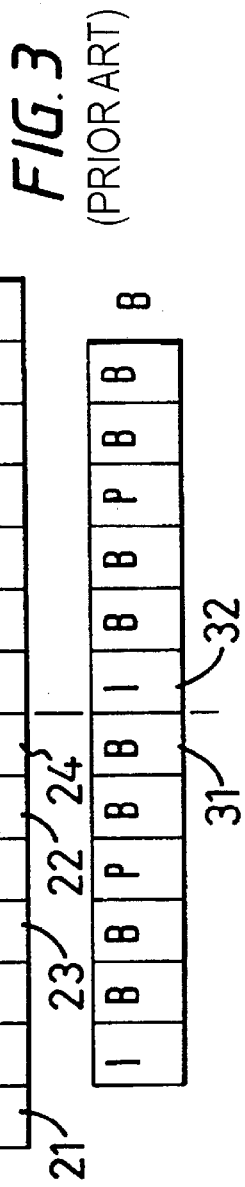

The decoder/re-encoder 12 has an input for receiving the first signal A. A syntax extractor 120 extracts the syntax data from the first signal and feeds it to a timing and control system 121 which controls the operation of the decoder/re-encoder 12. The I frames are then fed to an I-decoder 123. The I-decoder, which comprises an entropy decoder, a dequantiser Q and an inverse DCT transformer DCT, decodes the I-frames to digital base band. The decoded I-frames are applied via a frame reorderer 122 to a re-encoder 124. The re-encoder is in simplified form as shown in FIG. 2. It comprises a temporal redundancy reduction block 1 and a motion vector estimator and compensation unit 7 which remove temporal redundancy by producing signals representing the motion-compensated differences between predicted frames produced by unit 7 and the current frames supplied by the reorderer 122 to produce the B-frames. The differences are referenced to the first I-frame of the GOP. The difference frames in this embodiment are all B-frames. The control and timing unit 121 controls the encoder 124 so that alternative ones (even numbered) of the frames of the original signal of FIG. 10A are encoded as B-frames. The intervening frames (odd numbered) frames are re-encoded as I-frames by nulling the prediction frames produced by unit 7. The I and B frames are DCT transformed 2, quantised 3 at the same level Qv as the I-frames from which they are originally derived and entropy encoded 5.

The re-encoding of the first signal A may produce a data rate less than that of the channel/store 11, and dummy bits are inserted into the bit stream by a bit inserter or data packer 125. The bit inserter 125 is located after the syntax inserter 126 to insert dummy words into the video bit stream.

The encoded signal B of FIG. 10 is recovered from the channel/store 11 and is applied to the re-decoder 12, which is complementary to the encoder 12 and so will not be described herein in detail. In the decoder 13, the syntax is extracted (130) to recover the data relating to the quantisation levels Qv of the frames and the motion vectors. The frames are decoded 133 to digital baseband with any necessary frame reordering and re-encoded 134 as I-frames to recover the signal of FIG. 10A. The quantisation levels of the frames are maintained at their original levels as they are decoded and re-encoded.

Various modifications may be made to the apparatus of FIG. 11. The GOP of the first signal A may be of any standard MPEG form and some of the I-frames of the GOP are further encoded to P and/or B frames to improve coding efficiency. That can be done by suitable controlling the decoder/encoder 12 in known MPEG 2 manner. The I-frames which are re-encoded as inter-frames are re-encoded with their quantisation levels unchanged.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I Claim:

1. A method of processing a digitally encoded signal comprising intra-encoded pictures and inter-encoded pictures, the inter-encoded pictures having associated therewith respective quantisation levels, the method comprising extracting data from the encoded signal relating to said quantisation levels and converting all the inter-encoded pictures of the digitally encoded signal to intra-encoded pictures while retaining, based on said extracted data, the respective quantisation levels unchanged.

2. A method according to claim 1, in which motion vectors are associated with the inter-encoded pictures and further comprising also retaining unchanged the motion vectors in association with the respective converted pictures.

3. A method according to claim 4, furhter comprising editing the baseband pictures, and re-encoding the edited baseband pictures to intra-encoded pictures.

4. A method according to claim 1, wherein the step of converting comprises decoding the intra-encoded and inter-encoded pictures to baseband and re-encoding the baseband pictures as intra-encoded pictures.

5. Apparatus for processing a digitally encoded signal, the signal comprising intra-encoded pictures and inter-encoded pictures, the inter-encoded pictures having associated therewith respective quantisation levels, the apparatus comprising extracting means for extracting data from the encoded signal relating to said quantisation levels and converting means arranged to convert all the inter-encoded pictures of the digitally encoded signal to intra-encoded pictures while retaining, based on said extracted data, the respective quantisation levels of the pictures unchanged.

6. Apparatus according to claim 5, wherein motion vectors are associated with the inter-encoded pictures and the converting means is further arranged to retain unchanged the motion vectors in association with the respective converted pictures.

7. Apparatus according to claim 6, wherein the converting means comprises a decoder arranged to decode the intra-encoded pictures and the inter-encoded pictures to baseband, an encoder arranged to encode the baseband pictures as intra-encoded pictures, and control means for controlling the decoding and encoding to retain the quantisation levels of the pictures unchanged and to retain unchanged the motion vectors in association with those intra-encoded pictures produced by the encoder which are derived from inter-encoded pictures.

8. Apparatus according to claim 7, further comprising means for editing the baseband pictures, the encoder being arranged to encode the edited baseband pictures.

9. Apparatus according to claim 5, further comprising means for storing the intra-encoded pictures including the intra-encoded pictures converted from inter-encoded pictures.

10. Apparatus according to claim 9, wherein the storing means is a disc-recorder/reproducer.

11. A method of processing digitally encoded signals in which
   a first digitally encoded signal has intra-encoded pictures each having quantisation levels,
   at least some of the intra-encoded pictures of the first signal are converted to inter-encoded pictures, the quantisation levels thereof being retained unchanged, to produce a second digitally encoded signal and
   the said inter-encoded pictures of the second signal are re-converted to intra-encoded signals retaining unchanged the quantisation levels thereof, to produce a third signal.

12. A method according to claim 11, wherein the first signal comprises intra-encoded pictures and inter-encoded pictures, and at least some of the intra-encoded pictures are converted to further inter-encoded pictures, the quantisation levels thereof being retained unchanged to produce the said second digitally encoded signal.

13. A method according to claim 12, wherein the second signal is applied to means having a bandwidth which is:
   (a) less than that of the first signal; and
   (b) equal to or greater than that of the second signal.

14. A method according to claim 13, wherein the said means comprises a signal transmission channel of the said bandwidth.

15. A method according to claim 13, wherein the said means comprises a storage device.

16. A method according to claim 14, wherein dummy bits are added to the said second signal.

17. A method according to claim 11, wherein the first digitally encoded signal has a first GOP length, and the second signal has a second GOP length greater than the first GOP length.

18. A method according to claim 17, wherein at least some of the intra-encoded pictures of the first signal which are converted to inter-encoded pictures are converted to P-pictures.

19. A method according to claim 17, wherein at least some of the intra-encoded pictures of the first signal which are converted to inter-encoded pictures are converted to B-pictures.

20. A method according to claim 17, wherein the first GOP length is one.

21. Apparatus for processing digitally encoded signals, comprising
   means, having an input for receiving a first digitally encoded signal including at least intra-encoded pictures, for converting at least some of the intra-encoded pictures to inter-encoded pictures retaining unchanged the quantisation levels thereof to produce a second digitally encoded signal, and
   means for reconverting the said inter-encoded pictures of the second signal to intra-encoded pictures retaining unchanged the quantisation levels thereof to produce a third signal.

22. Apparatus according to claim 21, wherein the first signal includes inter-encoded pictures and intra-encoded pictures and the converting means is for converting some of the intra-encoded pictures to further inter-encoded pictures retaining unchanged the quantisation levels thereof to produce the said second signal.

23. Apparatus according to claim 22, further comprising means, to which the second signal is applied, having a bandwidth which is:

(a) less than that of the first signal; and (b) equal to or greater than that of the second signal.

24. Apparatus according to claim 23, wherein the said means, to which the second signal is applied, comprises a signal transmission channel of the said bandwidth.

25. Apparatus according to claim 23, wherein the said means, to which the second signal is applied, comprises a storage device.

26. Apparatus according to claim 23, comprising means for adding dummy bits to the second signal.

27. Apparatus according to claim 21, wherein the first signal has a first GOP length, and the converting means is arranged to produce a second signal having a second GOP length greater than the first length.

28. Apparatus according to claim 27, wherein at least some of the intra-encoded pictures of the first signal which are converted to inter-encoded pictures are converted to P-pictures.

29. Apparatus according to claim 27, wherein at least some of the intra-encoded pictures of the first signal which are converted to inter-encoded pictures are converted to B-pictures.

30. Apparatus according to claim 27, wherein the first GOP length is one.

* * * * *